United States Patent
Chen et al.

(10) Patent No.: US 7,995,681 B2
(45) Date of Patent: Aug. 9, 2011

(54) METHOD AND AN APPARATUS FOR TIMING CONTROL OF CHANNEL ESTIMATION

(75) Inventors: Po-Ying Chen, Hsinchu (TW); Jen-Wei Peng, Taipei County (TW); Wei-Ly Kuo, Taipei County (TW)

(73) Assignee: Sunplus mMobile Inc., Hsinchu (TW)

( * ) Notice: Subject to any disclaimer, the term of this patent is extended or adjusted under 35 U.S.C. 154(b) by 714 days.

(21) Appl. No.: 12/049,390

(22) Filed: Mar. 17, 2008

(65) Prior Publication Data
US 2009/0103640 A1 Apr. 23, 2009

(30) Foreign Application Priority Data
Oct. 22, 2007 (TW) ................................ 96139462 A

(51) Int. Cl.
*H04L 27/06* (2006.01)

(52) U.S. Cl. ........................................................ 375/340

(58) Field of Classification Search .................. 375/147, 375/260, 316, 340, 342
See application file for complete search history.

(56) References Cited

U.S. PATENT DOCUMENTS

| | | | |
|---|---|---|---|
| 6,370,397 B1 * | 4/2002 | Popovic et al. | 455/561 |
| 6,731,622 B1 * | 5/2004 | Frank et al. | 370/342 |
| 7,058,399 B2 | 6/2006 | Klein et al. | |
| 2007/0009065 A1 | 1/2007 | Kuo et al. | |
| 2007/0041431 A1 * | 2/2007 | Reial | 375/147 |

* cited by examiner

*Primary Examiner* — Don N Vo
(74) *Attorney, Agent, or Firm* — Jianq Chyun IP Office

(57) ABSTRACT

The present invention relates to a method and an apparatus for timing control of channel estimation. The method includes: sequentially shifting a channel estimation window in a power-delay profile in a specific time interval to obtain a plurality of candidate segments; sequentially calculating a metric corresponding to the candidate segments according to the delay paths and the channel power contained in the candidate segments; among the metrics, finding out an optimal segment with the maximum metric and deciding a timing of channel estimation based on the optimal segment.

15 Claims, 13 Drawing Sheets

| CANDIDATE SEGMENT | STARTING POSITION $X_i$ | TOTAL POWER $P_i$ | NUMBER OF DELAY PATH $L_i$ | METRIC $M(X_i)$ |
|---|---|---|---|---|
| D1 | $X_1$ | $P_1$ | $L_1$ | $M(X_1)$ |
| D2 | $X_2$ | $P_2$ | $L_2$ | $M(X_2)$ |
| D3 | $X_3$ | $P_3$ | $L_3$ | $M(X_3)$ |
| D4 | $X_4$ | $P_4$ | $L_4$ | $M(X_4)$ |
| D5 | $X_5$ | $P_5$ | $L_5$ | $M(X_5)$ |

FIG. 15

METHOD AND AN APPARATUS FOR TIMING CONTROL OF CHANNEL ESTIMATION

CROSS-REFERENCE TO RELATED APPLICATION

This application claims the priority benefit of Taiwan application serial no. 96139462, filed on Oct. 22, 2007. The entirety the above-mentioned patent application is hereby incorporated by reference herein and made a part of specification.

BACKGROUND OF THE INVENTION

1. Field of the Invention

The present invention generally relates to a method for timing control, and more particularly, to a method for timing control of channel estimation.

2. Description of Related Art

In a wireless communication environment, a Doppler shift caused by movement of a receiving end or a transmitting end or a multipath phenomenon caused by diffraction and refraction of electromagnetic wave traveling through obstacles between the receiving end and the transmitting end makes the received signal at the receiving end interfering by huge interference. Taking the current code division multiple access system (CDMA system) as an example, although the CDMA system transmits signals of multiple users simultaneously by using different spreading codes respectively corresponding to multiple users and prevents the signals of different users from interfering mutually based on the orthogonality between spreading codes; however, when a transmitted signal in the transmission channel suffers multipath interference, the orthogonality between spreading codes will be destroyed and introduces multiple-user interference (MUI).

In order to improve transmission quality, a CDMA system employs a channel estimation approach at the receiving end thereof to estimate response of the transmission channel and uses an equalizer to eliminate the effect of the transmission channel on the received signal. FIG. 1 is a systematic block diagram of a receiving end with an equalizer of a conventional CDMA system. Referring to FIG. 1, a channel estimation unit 110 estimates a channel impulse response through a received signal r(t), which means the delay time $\tau$ of each delay path and the corresponding channel gain $\hat{h}(\tau)$ of each delay time in the channel are estimated, and then the channel estimation unit 110 outputs the estimated channel gain $\hat{h}(\tau)$ to the equalizer 130. The equalizer 130 is used to eliminate the interference contained in the received signal r(t). After that, a correlator 150 despread the received signal after being proceeded by the equalizer 130 with the spreading code c[n] of a user terminal, and furthermore a decision unit 170 demodulate the despreaded received signal to obtain a digital signal $\hat{b}$.

However, for some channels with larger delay spread, the channel estimation unit 110 does not necessarily consider all the delay paths in the channel due to hardware limitation as shown by FIG. 2. FIG. 2 is a channel power-delay profile. Referring to FIG. 2, the abscissa herein represents delay time $\tau$ and the ordinate represents channel power, i.e. $|\hat{h}(\tau)|^2$. FIG. 2 contains six delay paths Path_1-Path_6, and six pulses herein represent the delay time and the powers of the delay paths Path_1-Path_6. In addition, a channel estimation window (CE window) is shown in FIG. 2 as well, wherein the length of the CE window represents the length of delay time that is able to cover whenever channel estimation processes. It can be seen from FIG. 2, the length of the CE window is less than the delay spread of the multipath. As a result, in a channel power-delay profile, no matter how the CE window is placed, the CE window is unable to cover all the delay paths Path_1-Path_6.

Based on the current technique level, there are two placing ways of CE window. The first way herein is based on the total channel power within a CE window, that is, to place a CE window at a position able to contain the maximum channel power, wherein the total power is the channel power summation of all the delay paths within the CE window. The second way is to directly define the starting position of signal frame, i.e. the first delay path arriving the receiving end, as the starting position of the CE window as shown by the placing position of the CE window in FIG. 2. Note that the delay paths Path_5 and Path_6 in FIG. 2 are not contained within the CE window. In other words, restricted by the hardware, a CE window is unable to cover all delay paths in a channel, which makes the channel estimation approach fail to estimate the real channel impulse response and further degrades the performance of the equalizer. Therefore, the position placing of a CE window is an important index to indicate the quality of channel estimation and further an important factor affecting the performance of the receiving end.

In the present patents however (for example, U.S. Pat. No. 7,058,399 and US patent publication No. 20070009065), only the arranging method of a multipath searcher (MPS) window in a CDMA system is disclosed, but nothing regards how to properly arrange a CE window.

SUMMARY OF THE INVENTION

Accordingly, the present invention is directed to a method for timing control of channel estimation. The provided method is able to place a CE window at a proper position so as to enable the receiving end to estimate a more complete channel impulse response to enhance the performance of the receiving end.

The present invention is also directed to an apparatus for timing control of channel estimation for adjusting the position of a CE window to improve the performance of the receiving end.

The present invention provides a method for timing control of channel estimation, which includes: receiving a received signal transmitted by a transmitting end through a channel having multiple delay paths; searching the delay time of each delay path and the corresponding channel power so as to obtain a channel power-delay profile; providing a channel estimation window (CE window); sequentially shifting the CE window position in the channel power-delay profile in a specific time interval to obtain a plurality of candidate segments; calculating a metric corresponding to each candidate segment according to the number of the delay paths and the channel power of the delay paths extracted from each of the candidate segments in the channel power-delay profile; among all the metrics corresponding to every candidate segment, finding out an optimal segment with the maximum metric; and, deciding a timing of channel estimation based on the optimal segment to.

In an embodiment of the present invention, the above-mentioned step for obtaining the candidate segments includes: sequentially rightwards shifting a position of the left-side window from the most left delay path up in the channel power-delay profile to obtain a plurality of left-side candidate segments; sequentially leftwards shifting a position of the right-side window from the most right delay path up in the channel power-delay profile to obtain a plurality of right-side candidate segments; when the position of the left-side window and the position of the right-side window are overlapped each other or when a starting position of the left-side window locates at the right side of a starting position of the right-side window, stopping shifting the left-side window and the right-side window wherein a set of the left-side candidate segments and the right-side candidate segments is the above-mentioned candidate segments.

In an embodiment of the present invention, the above-mentioned step for obtaining the candidate segments further includes: recording the starting positions of the candidate segments in the channel power-delay profile, wherein the starting position of the $i^{th}$ candidate segment is represented by $X_i$; recording the number of the delay path contained by the candidate segments in the channel power-delay profile, wherein the number of the delay path contained by the $i^{th}$ candidate segment is represented by $L_i$; recording the total power of the delay paths contained in the candidate segments in the channel power-delay profile, wherein the total power of the delay paths contained by the $i^{th}$ candidate segment is represented by $P_i$ which is the summation of the channel powers corresponding to the delay paths contained by the $i^{th}$ candidate segment.

In an embodiment of the present invention, the above-mentioned step for obtaining the candidate segments further includes: creating a table having a plurality of fields, wherein the $i^{th}$ field is corresponding to the $i^{th}$ candidate segment; storing the starting position $X_i$, the delay path number $L_i$ and the total power $P_i$ corresponding to the $i^{th}$ candidate segment into the $i^{th}$ field.

In an embodiment of the present invention, the step for calculating the metric corresponding to each candidate segment includes: calculating the metric corresponding to the $i^{th}$ candidate segment according to the delay path number $L_i$ and the total power $P_i$ stored in the $i^{th}$ field of the table and the metric corresponding to the $i^{th}$ candidate segment is represented by $M(X_i)$; storing the metric corresponding to the $i^{th}$ candidate segment $M(X_i)$ into the $i^{th}$ field. The metric corresponding to the $i^{th}$ candidate segment is expressed in following formula $M(X_i)=P_i \cdot \beta(L_i)$, wherein $\beta(L_i)$ is scaling factor of $L_i$ and the expression thereof is:

$$\beta(L_i) = \frac{L_i^{Li} e^{-(Li-1)}}{(L_i - 1)!}.$$

After calculating the metrics corresponding to the candidate segments, a candidate segment with the maximum metric among all the candidate segments is found out and is named as an optimal segment.

In an embodiment of the present invention, the starting position corresponding to the above-mentioned optimal segment is represented by $X_{max}$. After the step of finding out the above-mentioned optimal segment, the method further includes: providing a prior segment which indicates the position of the preceding channel estimation window in the channel power-delay profile, wherein the starting position of the prior segment is represented by $X_{prev}$; using the starting positions of the candidate segments stored in the table to find out a continuous segment most near to the prior segment $X_{prev}$ among the candidate segments, wherein the starting position of the continuous segment is represented by $X_{conti}$; using the metrics of the candidate segments stored in the table to determine whether the difference between the metric $M(X_{max})$ corresponding to the optimal segment and the metric $M(X_{conti})$ corresponding to the continuous segment is less than a threshold; if yes, deciding to take the continuous segment as a present segment; if no, deciding to take the optimal segment as the present segment, wherein the starting position of the present segment is represented by $X_{now}$.

In an embodiment of the present invention, after the above-mentioned step of deciding the present segment, the method further includes: determine whether or not the difference between the starting position $X_{now}$ of the present segment and the starting position $X_{prev}$ of the prior segment is less than a unit time; if yes, updating the starting position $X_{now}$ of the present segment with the starting position $X_{prev}$ of the prior segment; if no, keeping the starting position $X_{now}$ of the present segment; and shifting the CE window to the present segment.

The present invention also provides an apparatus for timing control of channel estimation, which includes a multipath searcher (MPS), a computing unit and an adjustment unit. The MPS herein searches a delay time of each of the delay paths of a channel and a channel power of each of the delay paths of the channel to obtain a channel power-delay profile. The computing unit sequentially shifts the position of a CE window in the channel power-delay profile in a specific time interval to obtain a plurality of candidate segments and further calculates a metric corresponding to each of the candidate segments according to a number of the delay paths and the channel power of the delay paths extracted from each of the candidate segments in the channel power-delay profile. Among all the metrics corresponding to every candidate segment, the adjustment unit finds out an optimal segment with the maximum metric and decides a timing of channel estimation based on the optimal segment.

In an embodiment of the present invention, the apparatus for timing control of channel estimation further includes a storage unit for storing a prior segment, wherein the prior segment indicates the position of the preceding channel estimation window in the channel power-delay profile.

In an embodiment of the present invention, after the adjustment unit obtains the optimal segment, the adjustment unit further calculates the difference between the metric corresponding to the candidate segment most near to the prior segment among the candidate segments and the metric of the optimal segment and decides a present segment according to the calculated difference of the metrics.

In an embodiment of the present invention, after the adjustment unit decides the present segment, the adjustment unit further calculates the difference between the starting position of the present segment in the channel power-delay profile and the starting position of the prior segment in the channel power-delay profile and adjusts the starting position of the present segment in the channel power-delay profile by using the calculated difference of the starting position, and after adjustment, the adjustment unit shifts the CE window to the present segment.

Since the present invention uses the number of the delay paths and the channel powers contained by each candidate segment to calculate the metric of each candidate segment, and further decides an optimal segment according to the metric so as to place the CE window at a proper position; therefore, the present invention enables the receiving end to more completely estimate the channel impulse response to improve the performance of the receiving end.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 15 is a table according to another embodiment of the present invention.

DESCRIPTION OF THE EMBODIMENTS

In order to place a CE window at a proper position to obtain a satisfied channel estimation result, the present invention provides a method and a timing control apparatus for timing control of channel estimation. For depiction convenience, the embodiments of the present invention are exemplarily based on a CDMA system, but anyone skilled in the art should understand the present invention is applicable to other spreading system or any communication system using a channel estimation approach for adjusting the position of a CE window.

Figure 3:
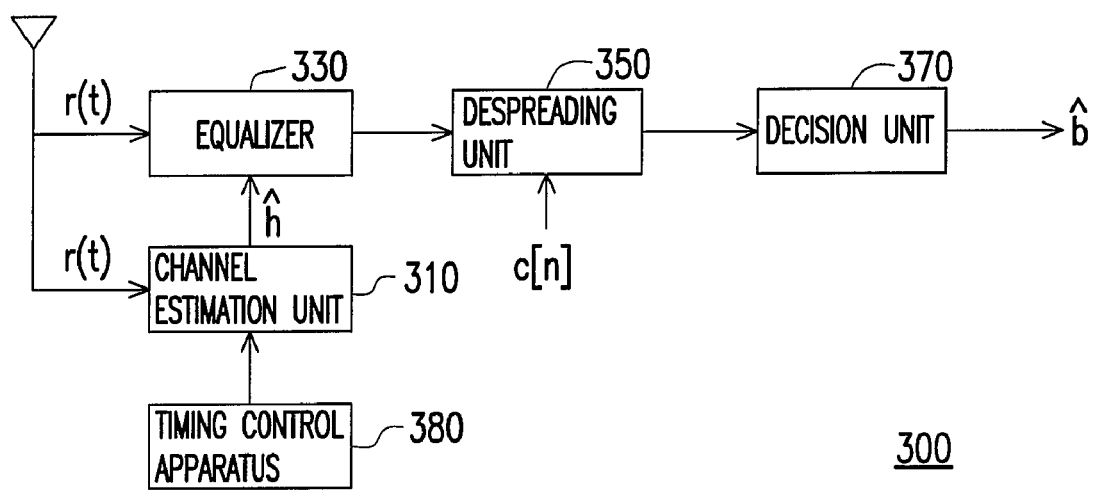
FIG. 3 is a systematic block diagram of a receiving end according to an embodiment of the present invention.

FIG. 3 is a systematic block diagram of a receiving end according to an embodiment of the present invention. Referring to FIG. 3, a receiving end 300 includes a channel estimation unit 310, an equalizer 330, a decision unit 370 and a timing control apparatus 380. The receiving end 300 receives a received signal r(t) sent from a transmitting end through a wireless transmission channel. The channel estimation unit 310 estimates a channel gain ĥ and inputs the estimated channel response to the equalizer 330. The equalizer 330 uses the channel gain ĥ from the channel estimation unit 310 to calculate the weight of the equalizer 330 so as to equalize the received signal r(t) and thereby eliminate the interference of multipath channel contained in the received signal r(t). In the embodiment, the weights of equalizer 330 is calculated based on liner minimum mean-square error algorithm (LMMSE algorithm) or least square algorithm (LS algorithm) or other adaptive signal processing technique. Considering the equalizer technique is not the key point of the present invention, it is herein omitted for simplicity.

Next, the despreading unit 350 receives the received signal after processing by the equalizer 330 and uses spreading code c[n] of the user terminal to despread the received signal. The decision unit 370 demodulates the received signal after despreading to obtain a digital signal b̂.

Restricted by the available hardware, the channel estimation unit 310 is unable to simultaneously and length-unlimited process the received signal r(t) to obtain a complete channel response. In other words, the channel estimation unit 310 has a CE window with a finite length, so that channel estimation processing by the channel estimation unit 310 from each time, only a part of channel estimation values can be extracted from CE window. However, the timing control apparatus 380 provided by the present invention is able to adjust the CE window position, so that the channel estimation unit 310 can extract proper channels to calculate the weights of the equalizer.

Figure 4:
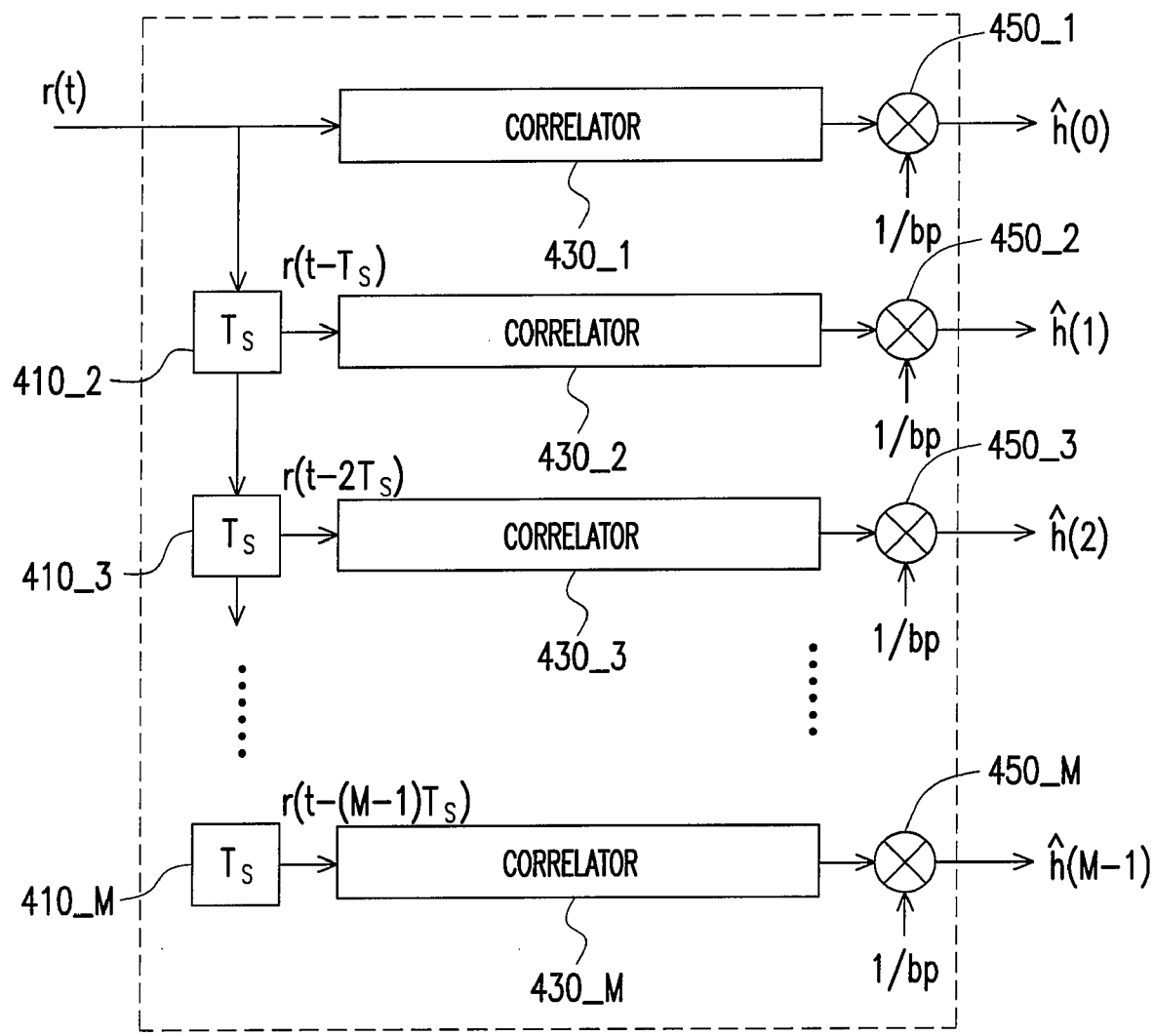
FIG. 4 is an internal architecture block diagram of a channel estimation unit 310 according to an embodiment of the present invention.

For depiction convenience of the timing control apparatus 380 provided by an embodiment of the present invention, the internal architecture block diagram of the channel estimation unit 310 is assembly shown as FIG. 4, but the present invention is not limited to the architecture of FIG. 4. Referring to FIG. 4, the channel estimation unit 310 includes a plurality of delay units 410_2-410_M, a plurality of correlators 430_1-430_M and a plurality of multipliers 450_1-450_M, wherein the channel estimation unit 310 is mainly processing channel estimation by using a known pilot symbol $b_P$ of the receiving end.

First, the received signal r(t) is sequentially delayed by a duration $T_S$ by the delay units 410_2-410_M, and the initial received signal r(t) and the delayed received signals r(t−$T_S$), r(t−2$T_S$), ..., r(t−(M−1)$T_S$) are respectively input to the correlators 430_1-430_M. Then, the correlators 430_1-430_M despreads and samples the received signal r(t) and the delayed received signals r(t−$T_S$), r(t−2$T_S$), ..., r(t−(M−1)$T_S$), following by respectively dividing the sampled signals by the pilot symbol $b_P$ using the multipliers 450_1-450_M so as to remove some signal components in the received signals for obtaining channel gains ĥ(0), ĥ(1), ĥ(2), ..., ĥ(M−1).

In the embodiment, assuming M=L×N, wherein L is chip number which the CE window is able to cover and N is over-sampling ratio, then, we have sampling time $T_S=T_C/N$. The $T_C$ herein is chip duration of the CDMA system. In the embodiment, the CE window length is $T_C$×L=$T_S$×M for extracting the above-mentioned signals r(t−$T_S$), r(t−2$T_S$), ..., r(t−(M−1)$T_S$) for performing channel estimation.

Figure 1:
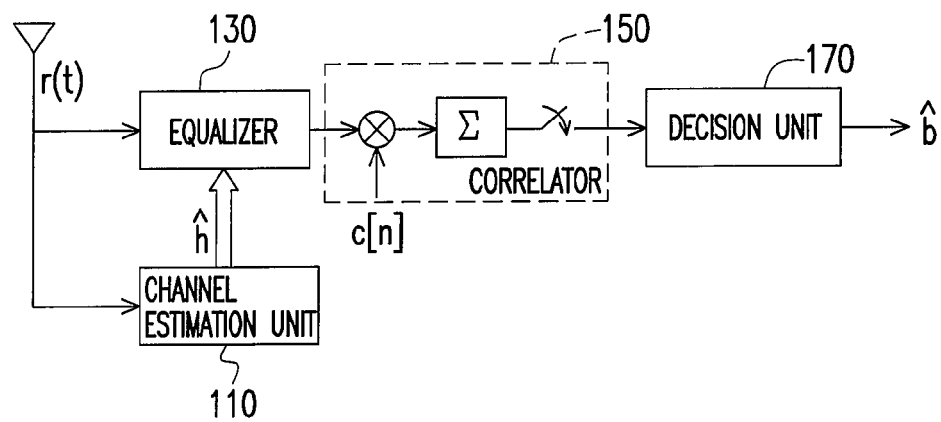
FIG. 1 is a systematic block diagram of a receiving end with an equalizer of a conventional CDMA system.
Figure 2:
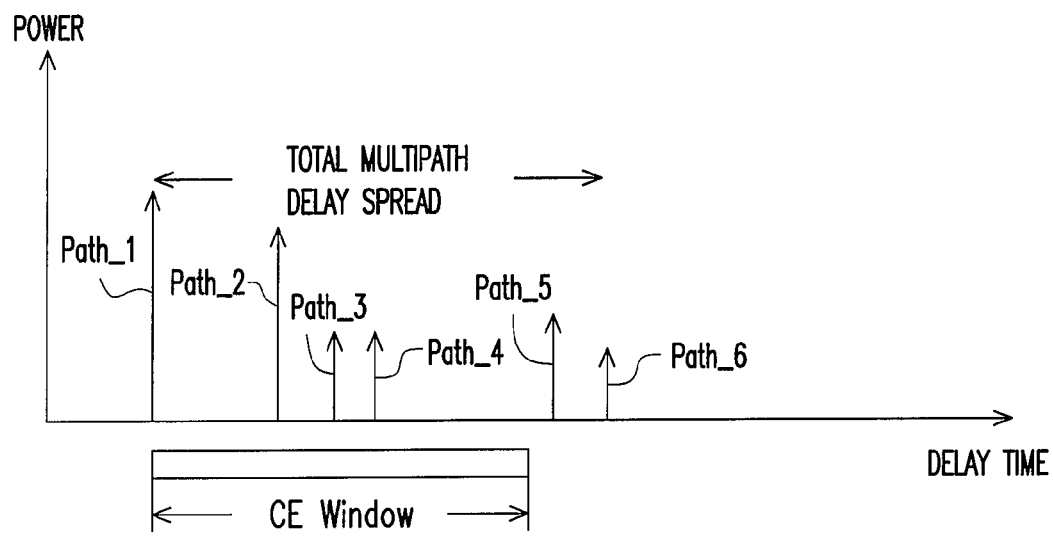
FIG. 2 is a channel power-delay profile.
Figure 5:
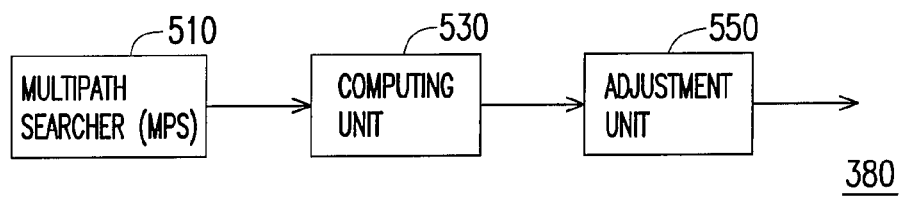
FIG. 5 is an internal architecture block diagram of a timing control apparatus 380 according to an embodiment of the present invention.

The timing control apparatus 380 provided by the present invention is able to adjust the timing of the CE window, that is, to adjust the signals can be cover by the channel estimation unit 310 for performing channel estimation. The internal architecture of the timing control apparatus 380 is shown by FIG. 5. Referring to FIG. 5, the timing control apparatus 380 includes a multipath searcher (MPS) 510, a computing unit 530 and an adjustment unit 550. The MPS 510 herein searches the delay time of each delay path in the channel and the corresponding channel power of each delay path so as to obtain a channel power-delay profile. In the embodiment, the channel power-delay profile is shown, for example, by FIG. 2, wherein the channel power corresponding to each delay path is, for example, the square of the channel gain corresponding to each delay path. Note that the delay time and the channel power can be the average delay time and the average channel power obtained by averaging the variation affected by the channel environment over a duration in which the MPS 510 observes the transmission channel. In addition, the delay time and the channel power can also be the instant delay time and the instant channel power.

After that, the computing unit 530 uses the channel power-delay profile obtained by the MPS 510 to sequentially shift the CE window position in the channel power-delay profile in a specific time interval to obtain a plurality of candidate segments. In the embodiment, the above-mentioned specific time interval can be chip duration $T_C$, sampling time $T_S$ or other predetermined time of the system. The CE window can be shifted in interval of the delay time of each delay path as well. Taking FIG. 2 as an example, the channel power-delay profile includes two candidate segments. The starting position of the first candidate segment is, for example, the delay time corresponding to the delay path Path_1, and the second candidate segment is, for example, the delay time corresponding to the delay path Path_2. The way for shifting the CE window can be gradually rightwards shifting from the earliest delay path Path_1 up until beyond the latest delay path Path_6; the way for shifting the CE window can also be gradually leftwards shifting from the latest delay path Path_6 up until beyond the earliest delay path Path_1.

Figure 6:
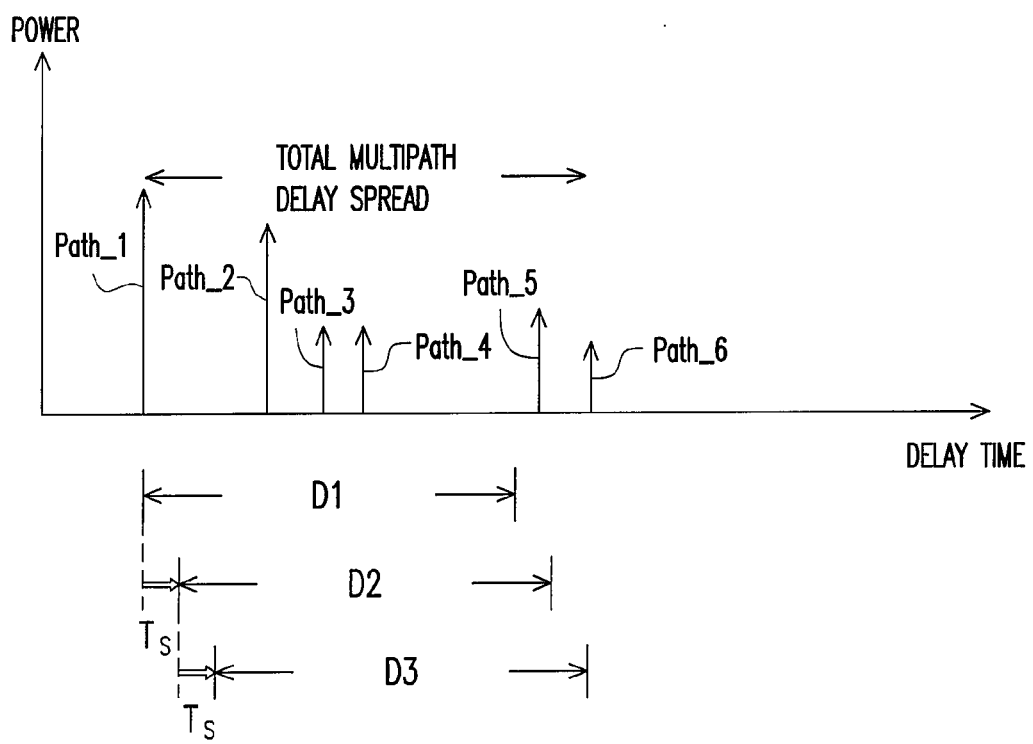
FIG. 6 is a diagram showing position shifting of a CE window according to an embodiment of the present invention.

In the embodiment, assuming the specific time interval for shifting the above-mentioned CE window is the sampling time $T_S$, the CE window gradually shifts rightwards from the earliest delay path Path_1 until beyond the latest delay path Path_6. FIG. 6 is a diagram showing position shifting of a CE window according to an embodiment of the present invention. Referring to FIG. 6, the CE window shifts rightwards in the interval of the sampling time $T_S$ to obtain a plurality of candidate segments D1, D2 and D3.

Referring to FIGS. 5 and 6, after the computing unit 530 obtains the candidate segments D1, D2 and D3, the metrics corresponding to the candidate segments D1, D2 and D3 are calculated according to the delay path number and the channel power corresponding to each of the candidate segments D1, D2 and D3 in the channel power-delay profile. For depiction convenience, the method for calculating the metric corresponding to each candidate segment would be explained in a rear paragraph of the description.

Further, the adjustment unit 550 finds out a candidate segment with the maximum metric as an optimal candidate segment among the candidate segments D1, D2 and D3, and uses the optimal segment to decide the timing of the channel estimation unit 310. For example, if the adjustment unit 550 determines the candidate segment D2 in FIG. 6 has the maximum metric and takes the candidate segment D2 as the optimal segment for placing the CE window. The channel estimation unit 310 would delay the received signal r(t) $T_S$, and then the signals to be extracted by $T_S$ for performing channel estimation are changed to the delayed received signals r(t−$T_S$), r(t−2$T_S$), ..., r(t−(M−1)$T_S$).

Although the above-mentioned embodiment directly take the optimal segment as the position of the CE window, but anyone skilled in the art should understand, the present invention can take the position of the optimal segment as a reference position for shifting the placing position of the CE window used in the channel estimation. Besides, the CE window in the above-mentioned embodiment has, for example, a fixed length; but in a real application, the CE window length can be adjusted to suit the real channel situation; therefore, the present invention does not limit the CE window length.

In the current CDMA system, the most common receiver is a rake receiver, which includes a plurality of fingers for respectively receiving the signal on each delay path in a channel and despreading the received signals. In association with the rake receiver, the current CDMA system further employs a MPS for searching and creating an average channel power-delay profile and updates the channel power-delay profile in an interval. The rake receiver further uses the results obtained by the MPS to properly place the delayed received signal received by each finger.

The MPS 510 in the above-mentioned embodiment can be implemented by any MPS used in a current CDMA system. In other words, the timing control apparatus 380 of the embodiment can use a conventional MPS to update the channel power-delay profile and then the computing unit 530 re-calculate the metric of each candidate segment to re-locate the optimal segment so as to update the CE window position from time to time according to the real channel situation. Although the timing control apparatus 380 in the above-mentioned embodiment uses the MPS in the CDMA system, but anyone skilled in the art should know, whenever an architecture can search out the delay time and the channel power corresponding to each delay path in a channel, the architecture is applicable to the timing control apparatus of the present invention, which means the present invention does not limit the above-described application scheme.

Figure 7:
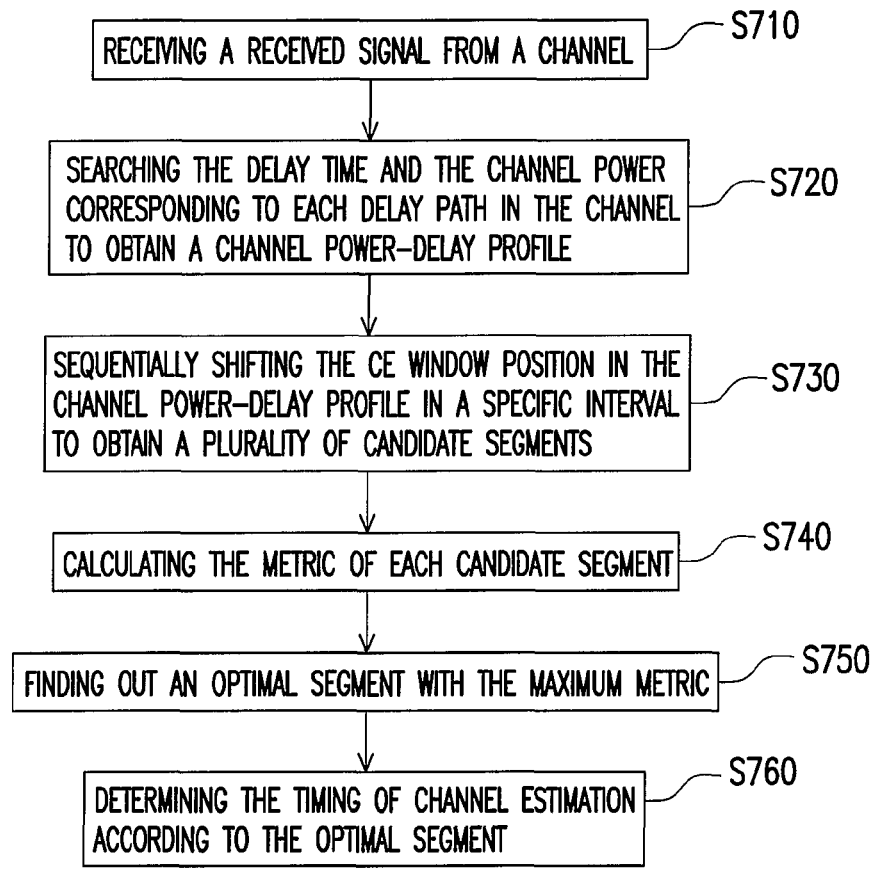
FIG. 7 is a flowchart of the method for timing control of channel estimation according to an embodiment of the present invention.

From the operations of the timing control apparatus 380 and the channel estimation unit 310 in the above-mentioned embodiment, a method for timing control of channel estimation can be extracted as shown by FIG. 7. FIG. 7 is a flowchart of the method for timing control of channel estimation according to an embodiment of the present invention. Referring to FIGS. 3, 4, 5 and 7, first, the receiving end 300 receives a received signal r(t) from a channel (step S710). Next, the MPS 510 searches out the delay time and the channel power corresponding to each delay path in the channel to obtain a channel power-delay profile (step S720). Then, the computing unit 530 sequentially shifts the CE window position in the channel power-delay profile in a specific time interval to obtain a plurality of candidate segments (step S730). After that, the computing unit 530 further calculates the metric of each of candidate segments according to the number of the delay paths and the channel power of each candidate segment extracted from the channel power-delay profile (step S740). Further, the adjustment unit 550 finds out an optimal segment with the maximum metric among the metrics of all candidate segments (step S750). Finally, the adjustment unit 550 uses the optimal segment to determine the timing of channel estimation (step S760), i.e. to determine the CE window position of the channel estimation unit 310 so as to adjust the received signal extracted by the channel estimation unit 310 performing the channel estimation from each time.

Figure 8:
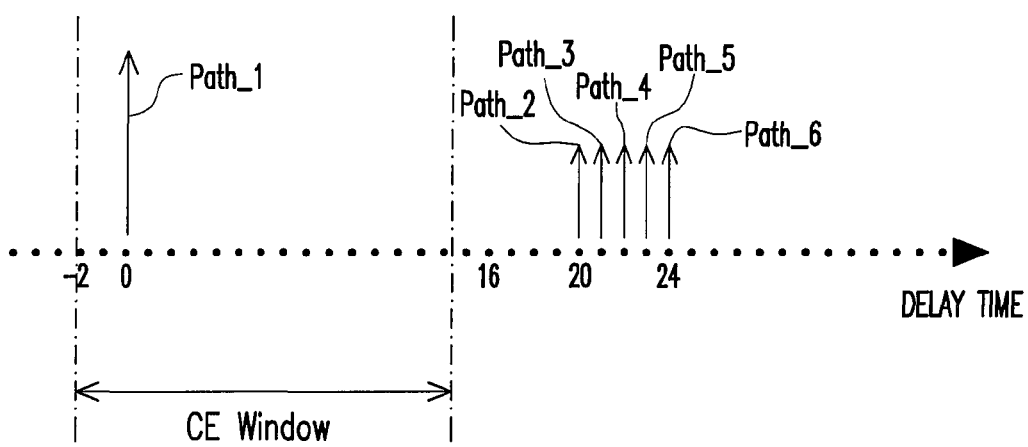
FIG. 8 is a channel power-delay profile of a channel model.

Prior to explaining how the present invention obtains the metric corresponding to each candidate segment; the influence of the delay path number contained by the CE window on the performance of the receiving end needs to be depicted. A channel model configured in advance is shown by FIG. 8. FIG. 8 is a channel power-delay profile of a channel model. Referring to FIG. 8, the abscissa herein represents delay time and each interval represents a chip duration $T_C$ and the ordinate (not shown) represents power of delay path. The channel model in FIG. 8 includes six delay paths Path_1-Path_6, wherein the delay paths Path_2-Path_6 have a same power, and the power of the delay path Path_1 is greater than the powers of the delay paths Path_2-Path_6. In addition, the delay path Path_1 is corresponding to zero of abscissa, which is served as the reference base of delay time.

Figure 9:
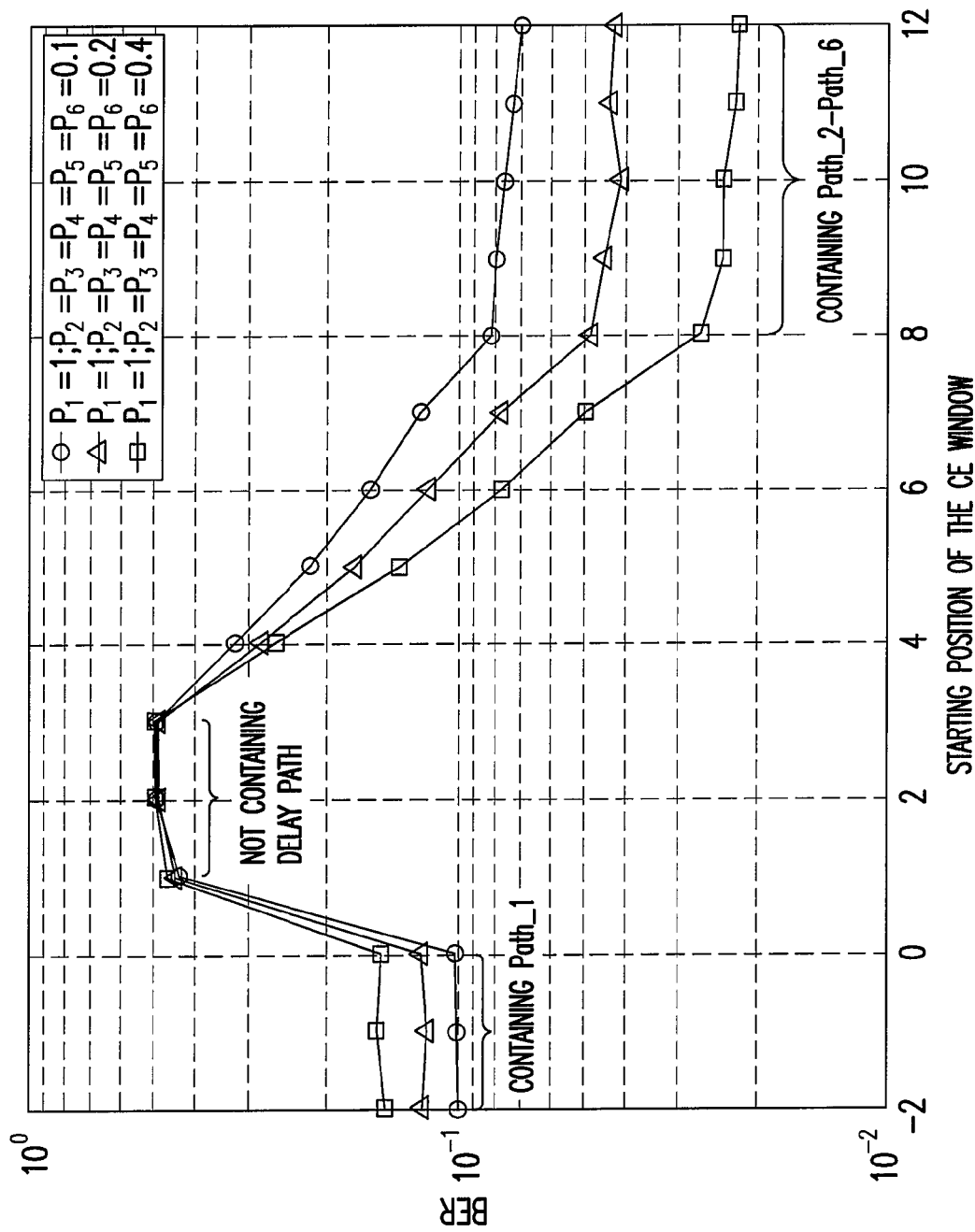
FIG. 9 is a trend chart of bit error rate (BER) under different CE window position.

In the following, computer simulation results are described. The simulation targets the receiving end system and the channel model in FIG. 8, where the performance of the receiving end is examined by sequentially shifting the CE window position. FIG. 9 is a trend chart of bit error rate (BER) under different CE window position. Referring to FIG. 9, the abscissa herein represents starting position of CE window and the ordinate represents BER. In the simulation, the CE window length takes 16 chip duration $T_C$ in total, and the rightwards shifting stars from the abscissa position '−2'. FIG. 9 shows three simulation result curves, wherein the first curve (marked in circle dice and straight lines) is corresponding to the power of the delay path Path_1 equal to 1 and the powers of the delay paths Path_2-Path_6 equal to 0.1; the second curve (marked in triangle dice and straight lines) is corresponding to the power of the delay path Path_1 equal to 1 and the powers of the delay paths Path_2-Path_6 equal to 0.2; the third curve (marked in square dice and straight lines) is corresponding to the power of the delay path Path_1 equal to 1 and the powers of the delay paths Path_2-Path_6 equal to 0.4.

In the second simulation curve of FIG. 9, the power summation of the delay paths Path_2-Path_6 is exactly equal to the power of the delay path Path_1. It can be seen from the second simulation curve however, once the starting position of the CE window shifts to $8T_C$ and beyond, the CE window contains the delay paths Path_2-Path_6 only, while the BER at the time is clearly less than the BER corresponding to the CE window containing the delay path Path_1 only. Even in the first simulation curve of FIG. 9, the power summation of the delay paths Path_2-Path_6 is equal to 0.5 which is just a half of the power of the delay path Path_1, but the BER corresponding to the CE window containing the delay paths Path_2-Path_6 is still less than the BER of the CE window containing the delay path Path_1. In addition, it can be seen from the third simulation curve, the greater the power of the delay paths the CE window contains, the less the corresponding BER is.

According to the above-described simulation results, the power of the delay paths a CE window contains and the number of the contained delay paths would significantly affect the performance of a receiving end. Accordingly, the algorithm of the metric corresponding to the candidate segment must be related to the power of the delay paths the candidate segment contains and the number of the delay paths.

Figure 10:
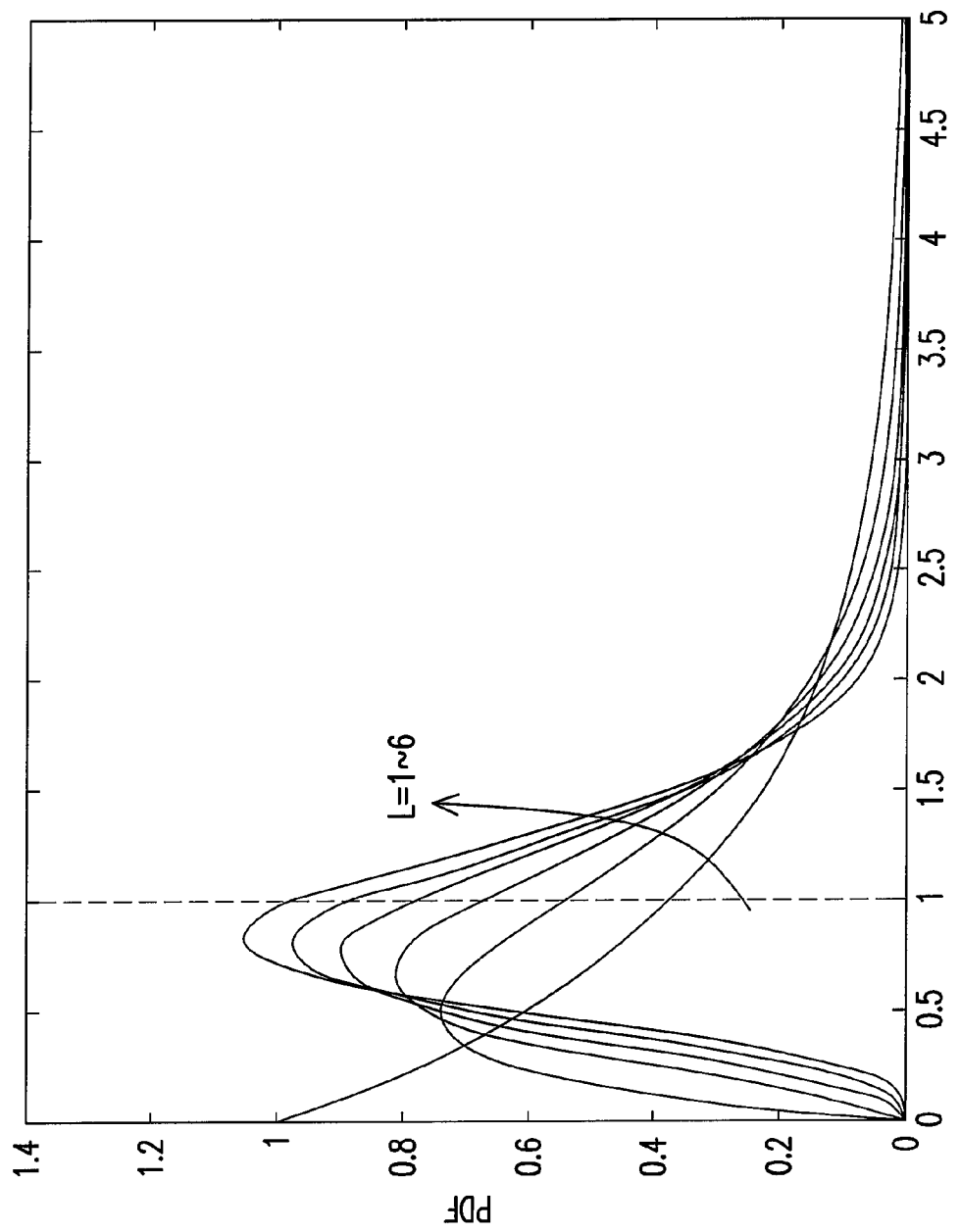
FIG. 10 illustrates probability density function (PDF) distribution of total powers with average SNR corresponding to different number of delay paths.

In order to implement the present invention through the teaching of this embodiment for those of ordinary skills in the art, the embodiment provides a formula for calculating a metric as follows:

$$M(X_i) = P_i \cdot \beta(L_i) \quad (1),$$

wherein $X_i$ represents position of the $i^{th}$ candidate segment, $M(X_i)$ represents metric corresponding to the $i^{th}$ candidate segment, $P_i$ represents total power of the delay paths contained by the $i^{th}$ candidate segment, $L_i$ represents number of delay paths contained by the $i^{th}$ candidate segment and $\beta(L_i)$ is scaling factor of $L_i$ which is expressed by:

$$\beta(L_i) = p(\bar{\gamma}_L)/p(\bar{\gamma}_1) \quad (2),$$

wherein $p(\bar{\gamma}_L)$ and $p(\bar{\gamma}_1)$ respectively represent the probability density functions (PDF) of $\bar{\gamma}_L$ and $\bar{\gamma}_1$, $\bar{\gamma}_L$ represents average signal-to-noise ratio (average SNR) and $\bar{\gamma}_1$ represents average SNR of one delay path. In a multipath channel, each delay path is in the rough affected by Rayleigh fading, which means the PDF of SNR corresponding to each delay path can be treated as a Rayleigh distribution. After the SNRs of L delay paths are processed by maximal ratio combining (MRC) algorithm, the PDF thereof is represented by $p(\gamma_L)$. FIG. 10 illustrates probability density function (PDF) distribution of total powers with average SNR corresponding to different number of delay paths, where the number of delay paths L=1-6 are shown. It can be seen from FIG. 10, when $\gamma_L$=1, the amount of $p(\gamma_L)$ is increased with increasing L.

In the above-listed equation (2), assuming the PDF $p(\gamma_1)$ of all delay paths are Rayleigh distributions and $\gamma_L$=1, then, the equation (2) can be expressed by:

$$\beta(L_i) = p(\bar{\gamma}_L)/p(\bar{\gamma}_1) = \frac{L_i^{L_i} e^{-(L_i-1)}}{(L_i-1)!}. \quad (3)$$

It can be seen from the equation (3), $\beta(L_i)$ is a increasing strictly with $L_i$. Thus, according to the equation (1), the metric $M(X_i)$ of the candidate segment in the embodiment is determined by, for example, the scaling factor $\beta(L_i)$ which is obtained by means of the total power $P_i$ of the delay paths contained by the $i^{th}$ candidate segment and the delay path number $L_i$ contained by the $i^{th}$ candidate segment, which means once two candidate segments have the same total power, in the embodiment, the candidate segment with a larger delay path number has a larger metric.

From the definition of $\beta(L)$ in the above-mentioned equation (3), the following results are further obtained: $\beta(1)$=1, $\beta(2)$=1.4715, $\beta(3)$=1.827, $\beta(4)$=2.1242, $\beta(5)$=2.3848, $\beta(6)$=2.6197 . . . . In fact, the function $\beta(L)$ provided by the present invention is not a linear function. Along with increasing L, the function $\beta(L)$ increases less and less. From a physical point of view, the amplitude of each delay path in a channel would encounter fading, so that in consideration of multiple delay paths (i.e. a CE window contains multiple paths), the signal replicas passed through multipath channels and received by a receiving end are unlikely to encounter deep fades simultaneously and thereby the performance of the receiving end is improved. This is so called the diversity gain. In other words, the multiple delay paths contained by the CE window contribute to enhance the performance of the receiving end.

However, the above-mentioned diversity gain increases less and less as the number of diversity branches increases. When the delay paths to be considered by the receiving end reaches a specific number, the effect to enhance the performance of a receiving end gets less obvious, which explains why along with increasing delay path number L, the increasing amplitude of the function $\beta(L)$ gets less and less and thereby the increasing amplitude of the metric is reduced.

In order to lower down the computing complexity, the function values of the above-mentioned function $\beta(L)$ with the delay path number L can be stored in advance. During calculating the metrics of the above-mentioned candidate segments, once the computing unit 530 is informed of delay path number contained by each candidate segment, the stored function values can be directly used to obtain the value of the function $\beta(L)$. Further, those function values of $\beta(L)$ with the delay path number L can be stored into a table in the computing unit 530. In addition, in the equation (3), the function $\beta(L)$ is obtained by assuming the SNR of each delay path has Rayleigh distribution; but anyone skilled in the art should understand a real channel environment is not necessarily a Rayleigh distribution. Accordingly, the function $\beta(L)$ must be designed according to the real channel environment and the design of system.

In the above-mentioned embodiment, the metric of a candidate segment is obtained by directly multiplying the total power of the corresponding delay paths by the function $\beta(L)$; but anyone skilled in the art should understand the metric of a candidate segment can be also obtained by calculations using the gain of every delay path in the candidate segment or the power of every delay path in the candidate segment. In other words, once a metric is obtained by calculations using the powers of the delay paths contained by a candidate segment, or channel gains and the delay path number, the approach is considered to fall in the spirit of the present invention.

Although by shifting the position of CE window in the above-mentioned embodiment is able to improve the performance of a receiving end, but during shifting the CE window, if the distance of shifting the CE window is too large, the receiving end may not miss a part of the received signal for processing to lose some data at the receiving end. To avoid the above-mentioned problem, the present invention further introduces a mechanism to prevent the position jumping of CE window, which another embodiment of the present invention would cover.

Figure 11:
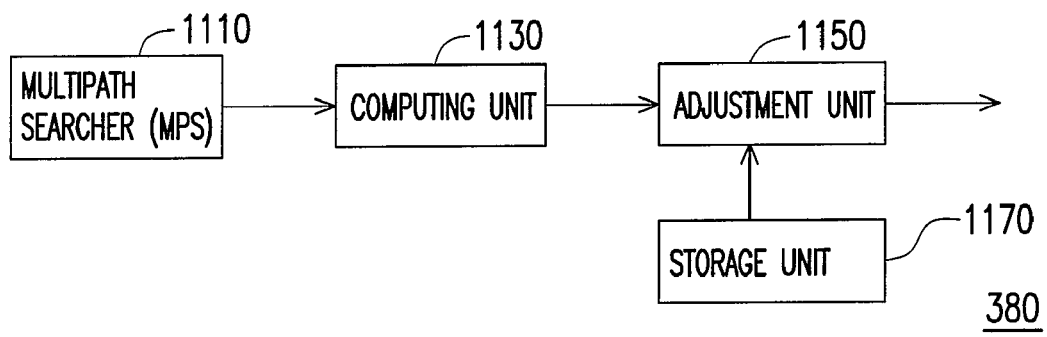
FIG. 11 is an internal architecture block diagram of a timing control apparatus 380 according to another embodiment of the present invention.

For depiction convenience, assuming the embodiment is used in a CDMA system and the system block diagram of the receiving end is shown as FIG. 3, in the embodiment, except for the timing control apparatus 380, the other components in the receiving end 300 has the same functions as the above-mentioned embodiment, which are omitted to describe. FIG. 11 is an internal architecture block diagram of a timing control apparatus 380 according to another embodiment of the present invention. Referring to FIG. 11, the timing control apparatus 380 includes a MPS 1110, a computing unit 1130, an adjustment unit 1150 and a storage unit 1170, wherein the MPS 1110, the computing unit 1130 and the adjustment unit 1150 have the same functions as the embodiment of FIG. 5 and are omitted to describe.

It can be seen from the above-mentioned embodiment, after each time the MPS 1110 updates the channel power-delay profile, the adjustment unit 1150 can re-adjust the position of the CE window in the channel estimation unit 310 to control the timing of the received signal r(t) extracted by the channel estimation unit 310. However, when the distance of shifting the CE window by the adjustment unit 1150 is too large, the receiving end may not miss a part of the received signal for processing to lose some data at the receiving end. To overcome the above-mentioned problem, the embodiment employs a storage unit 1170 to store a prior segment, and the prior segment, for example, occupies the position of the CE window in the channel power-delay profile before the MPS 1110 updates the channel power-delay profile. The adjustment unit 1150 of the embodiment further has an adjustment mechanism, which uses the stored prior segment to avoid unnecessarily shifting the position of the CE window to further overcome the problem caused by a too large shifting distance of the CE window in the channel estimation unit 310. In the following a flowchart of the method for timing control of channel estimation provided by the embodiment of the present invention is described.

Figure 12:
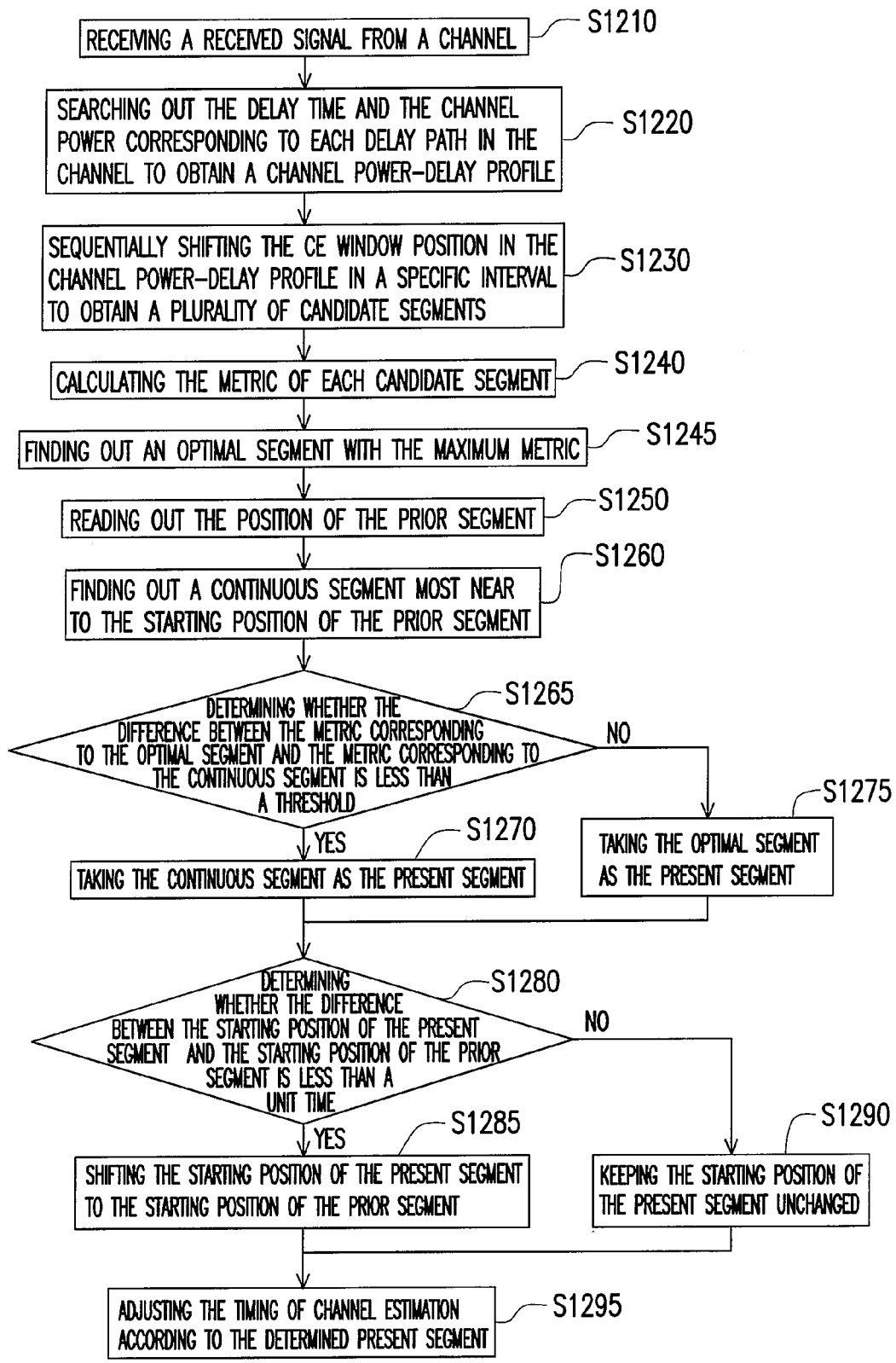
FIG. 12 is a flowchart of the method for timing control of channel estimation according to another embodiment of the present invention.

FIG. 12 is a flowchart of the method for timing control of channel estimation according to another embodiment of the present invention. Referring to FIGS. 3, 4, 11 and 12, first, the receiving end 300 receives a received signal r(t) from a channel (step S1210). Next, the MPS 1110 searches out the delay time and the channel power corresponding to each delay path in the channel to obtain a channel power-delay profile (step S1220). The channel power-delay profile is for example shown in FIG. 2.

Then, the computing unit 1130 sequentially shift the CE window position in the channel power-delay profile in a specific time interval to obtain a plurality of candidate segments (step S1230), wherein the specific time interval is, for example, the delay time between two adjacent delay paths.

Figure 13:
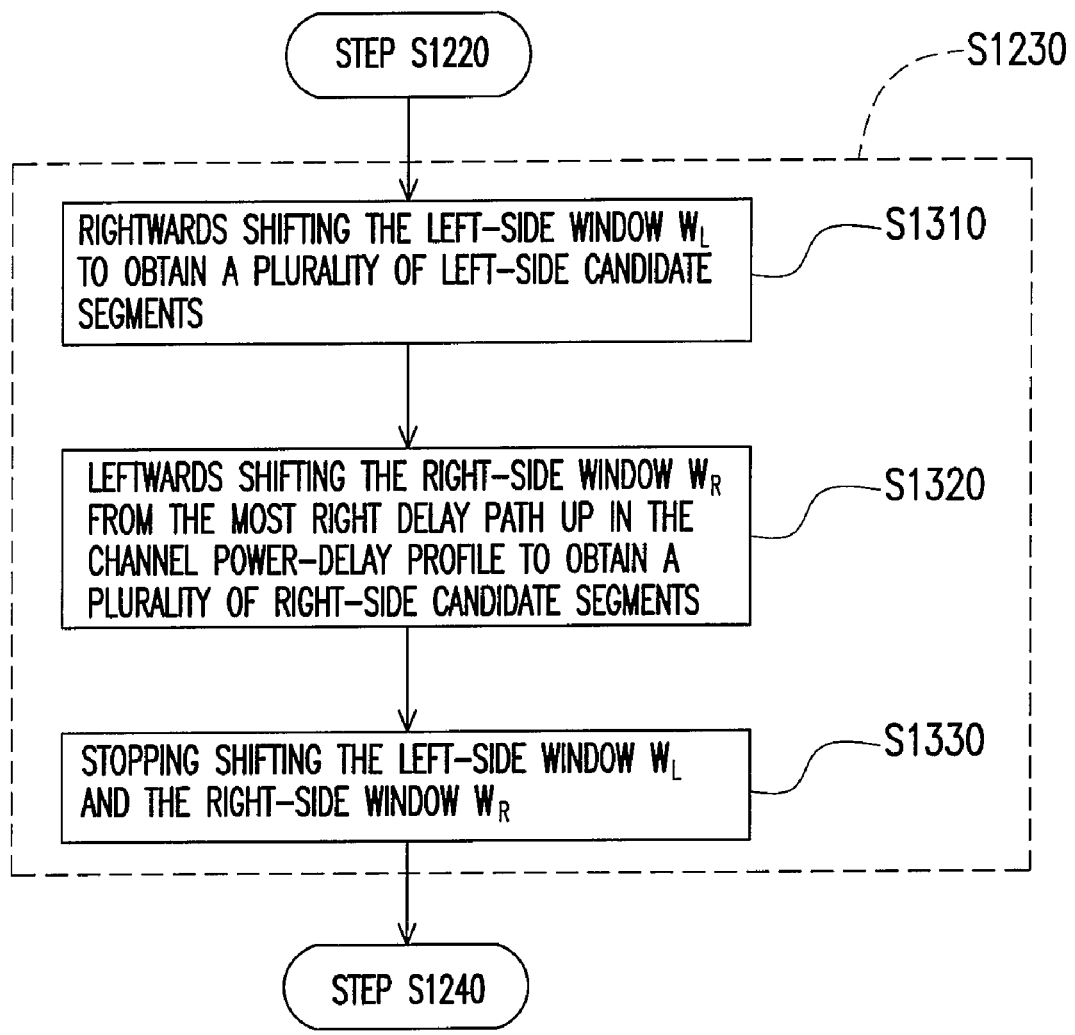
FIG. 13 is a sub-step flowchart of the step S1230 according to another embodiment of the present invention.
Figure 14:
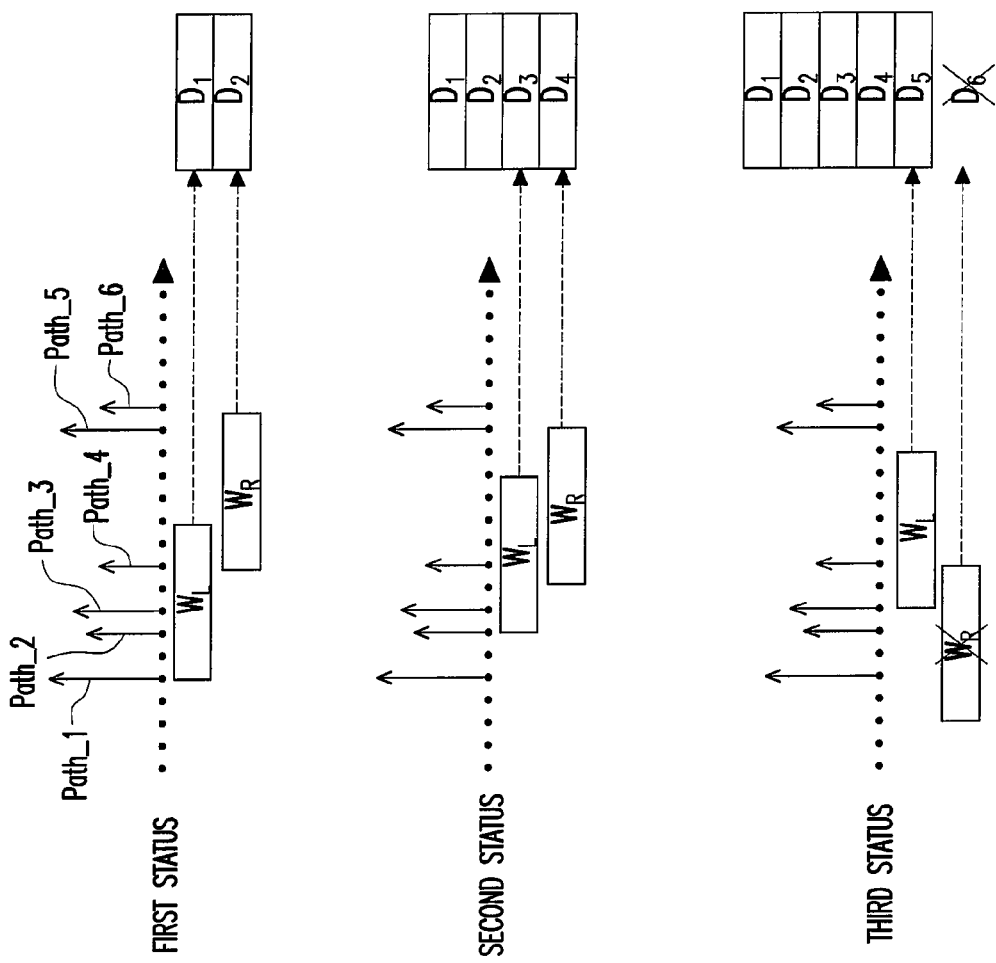
FIG. 14 is a diagram showing three statuses of a left-side window $W_L$ and a right-side window $W_R$ in another embodiment of the present invention.

In order to speed up the job for the computing unit 1130 to search out the candidate segment, during searching the candidate segment, the CE window in the embodiment is divided into, for example, a left-side window $W_L$ and a right-side window $W_R$, and the computing unit 1130 simultaneously shifts the left-side window $W_L$ and the right-side window $W_R$ for searching the candidate segment. Accordingly, the above-mentioned step S1230 further includes multiple sub-steps as shown by FIG. 13. In addition, FIG. 14 is a diagram showing three statuses of a left-side window $W_L$ and a right-side window $W_R$ in another embodiment of the present invention. Referring to FIGS. 13 and 14, after the computing unit 1130 obtains the channel power-delay profile, the computing unit 1130 rightwards shifts the left-side window $W_L$ from the most left delay path in the channel power-delay profile to obtain a plurality of left-side candidate segments (sub-step S1310); then, the computing unit 1130 leftwards shifts the right-side window $W_R$ from the most right delay path in the channel power-delay profile to obtain a plurality of right-side candidate segments (sub-step S1320).

The first status in FIG. 14 (i.e. the initial status to shift the left-side window $W_L$ and the right-side window $W_R$) indicates the starting position of shifting the left-side window $W_L$ is corresponding to the delay time of the Path_1 and a left-side candidate segment D1 is obtained, while the starting position of shifting the right-side window $W_R$ is corresponding to the delay time of the Path_6 and a right-side candidate segment D2 is obtained. The second status in FIG. 14 indicates the left-side window $W_L$ is shifted to the delay time of the Path_2 by the interval between two adjacent delay paths and a left-side candidate segment D3 is obtained, while the right-side window $W_R$ is shifted to the delay time of the Path_5 by the interval between two adjacent delay paths and a right-side candidate segment D4 is obtained.

Further, when the shifting left-side window $W_L$ and the shifting right-side window $W_R$ are overlapped each other or when the starting position of the left-side window $W_L$ locates at the right side of the starting position of the right-side window $W_R$, the computing unit 1130 stops shifting the left-side window $W_L$ and the right-side window $W_R$ (sub-step S1330), which means when the left-side candidate segments obtained by the left-side window $W_L$ and the right-side candidate segments obtained by the right-side window $W_R$ respectively contain the same delay paths, the left-side window $W_L$ and the right-side window $W_R$ would stop shifting and the repeated candidate segment is deleted. The third status in FIG. 14 indicates the left-side window $W_L$ is shifted to the delay time of the Path_3 from the delay time of the Path_2 and a left-side candidate segment D5 is obtained, while the right-side window $W_R$ is shifted to the Path_4 delay time from the Path_5 delay time; but the starting position of the right-side window $W_R$ at the time is located in the left of the starting position of the left-side window $W_L$, therefore, the right-side candidate segment D6 obtained by the right-side window $W_R$ would be deleted. In the end, the left-side candidate segments obtained by the left-side window $W_L$ are D1, D3 and D5, and the right-side candidate segments obtained by the right-side window $W_R$ are D2 and D4. All the candidate segments are the set of the left-side candidate segments D1, D3 and D5 and the right-side candidate segments D2 and D4, i.e. D1-D5. The above-mentioned shifting mode by using an interval between two adjacent delay paths to shift the CE window is advantageous in obtaining candidate segments with the least number and all possible selection and reducing the tables required by storing the candidate segments.

Back referring to FIGS. 11 and 12, after obtaining the candidate segments, the computing unit 1130 further calculates the metric of each candidate segment according to the number of the delay paths and the channel power corresponding to the delay paths extracted from the candidate segment in the channel power-delay profile (step S1240). The metric is calculated by using, for example, the above-mentioned equations (1) and (3). In the above-mentioned steps S1230 and S1240, whenever a candidate segment is obtained, the computing unit 1130 directly calculates the metric of the newly obtained candidate segment; or the computing unit 1130 starts to calculate the metrics corresponding to every candidate segment only after obtaining all candidate segments. In addition, the computing unit 1130 can also create a table to record the starting positions, the total powers of the delay paths extracted from the candidate segment, the numbers of delay paths and the calculated metrics of the obtained candidate segments in the channel power-delay profile, as shown by FIG. 15. In the above-mentioned embodiment, the computing unit 1130 locates five candidate segments D1-D5, thus, the FIG. 15 has five fields for respectively recording the starting positions, the total powers, the numbers of the delay paths and the calculated metrics of the five candidate segments D1-D5.

After the step S1240, the adjustment unit 1150 finds out an optimal segment with the maximum metric and takes the candidate segment as the optimal segment for placing the CE window (step S1245). To overcome the problem of data loss during shifting the CE window caused by unwanted CE window jumping, after determining the optimal segment, the embodiment further conducts following steps. For depiction convenience, the starting position corresponding to the optimal segment is represented by $X_{max}$ and $X_{max}=\max_{X_i}\{M(X_i)\}$, wherein $X_i$ is the starting position of the candidate segments, i=1-5.

Thereafter, the adjustment unit 1150 reads out the position of the prior segment from the storage unit 1170 (step S1250), wherein the starting position of the prior segment is represented by $X_{prev}$. Then, the adjustment unit 1150 uses the starting positions ($X_1$-$X_5$) stored in the table of FIG. 15 to find out a continuous segment most near to the starting position of the prior segment (step S1260), wherein the starting position of the continuous segment is represented by $X_{conti}$ and $X_{conti}=\min_{X_i}\{|X_i-X_{prev}|\}$.

Further, the adjustment unit 1150 uses the metrics stored in the table of FIG. 5 to determine whether the difference between the metric corresponding to the optimal segment $M(X_{max})$ and the metric corresponding to the continuous segment $M(X_{conti})$ is less than a threshold, i.e. to determine whether or not the argument of $M(X_{max})-M(X_{conti})$<threshold is true (step S1265). If $M(X_{max})-M(X_{conti})$<threshold, it indicates, after updating the channel power-delay profile, the difference between the metric corresponding to the segment most near to the last CE window position and the metric corresponding to the optimal segment is small. Thus, the adjustment unit 1150 takes the continuous segment as a present segment (step S1270). In the following step, if $M(X_{max})-M(X_{conti})\geq$threshold, it indicates, after updating the channel power-delay profile, the difference between the metric corresponding to the segment most near to the last CE window position and the metric corresponding to the optimal segment is large. Thus, the adjustment unit 1150 takes the optimal segment as the present segment (step S1275). The starting position of the present segment herein is represented by $X_{now}$.

After deciding the present segment, the adjustment unit 1150 determines again whether the difference between the starting position of the present segment $X_{now}$ and the starting position of the prior segment $X_{prev}$ is less than a unit time, i.e. to determine whether or not the argument of $|X_{now}-X_{prev}|<T_C$ is true (step S1280). In the embodiment, the unit time is, for example, a chip duration $T_C$. If $|X_{now}-X_{prev}|<T_C$ the adjustment unit 1150 adjusts the starting position $X_{now}$ of the present segment to the starting position $X_{prev}$ of the prior segment (step S1285), so that $X_{now}=X_{prev}$. In other words, since the difference between the starting position of the present segment $X_{now}$ determined by the adjustment unit 1150 and the starting position of the prior segment $X_{prev}$ is less than a chip duration $T_C$, thus, the adjustment unit 1150 does not need to shift the CE window position in the channel estimation unit 310. In contrast, if $|X_{now}-X_{prev}|\geq T_C$, the adjustment unit 1150 would keep the starting position $X_{now}$ of the present segment unchanged (step S1290). Finally, the adjustment unit 1150 uses the determined present segment to adjust the timing of channel estimation (step S1295) to determine the signal extracted by the channel estimation unit 310 each time performing channel estimation. In the embodiment, the adjustment unit 1150 can, for example, directly uses $X_{now}$ determined by the step S1285 or S1290, so that the input signal for the channel estimation unit 310 to perform channel estimation by the delayed received signal $r(t-X_{now})$, $r(t-X_{now}-T_S)$, $r(t-X_{now}-2T_S)$, ..., $r(t-X_{now}-(M-1)T_S)$ changed from the initial $r(t)$, $r(t-T_S)$, $r(t-2T_S)$, ..., $r(t-(M-1)T_S)$.

Figure 16:
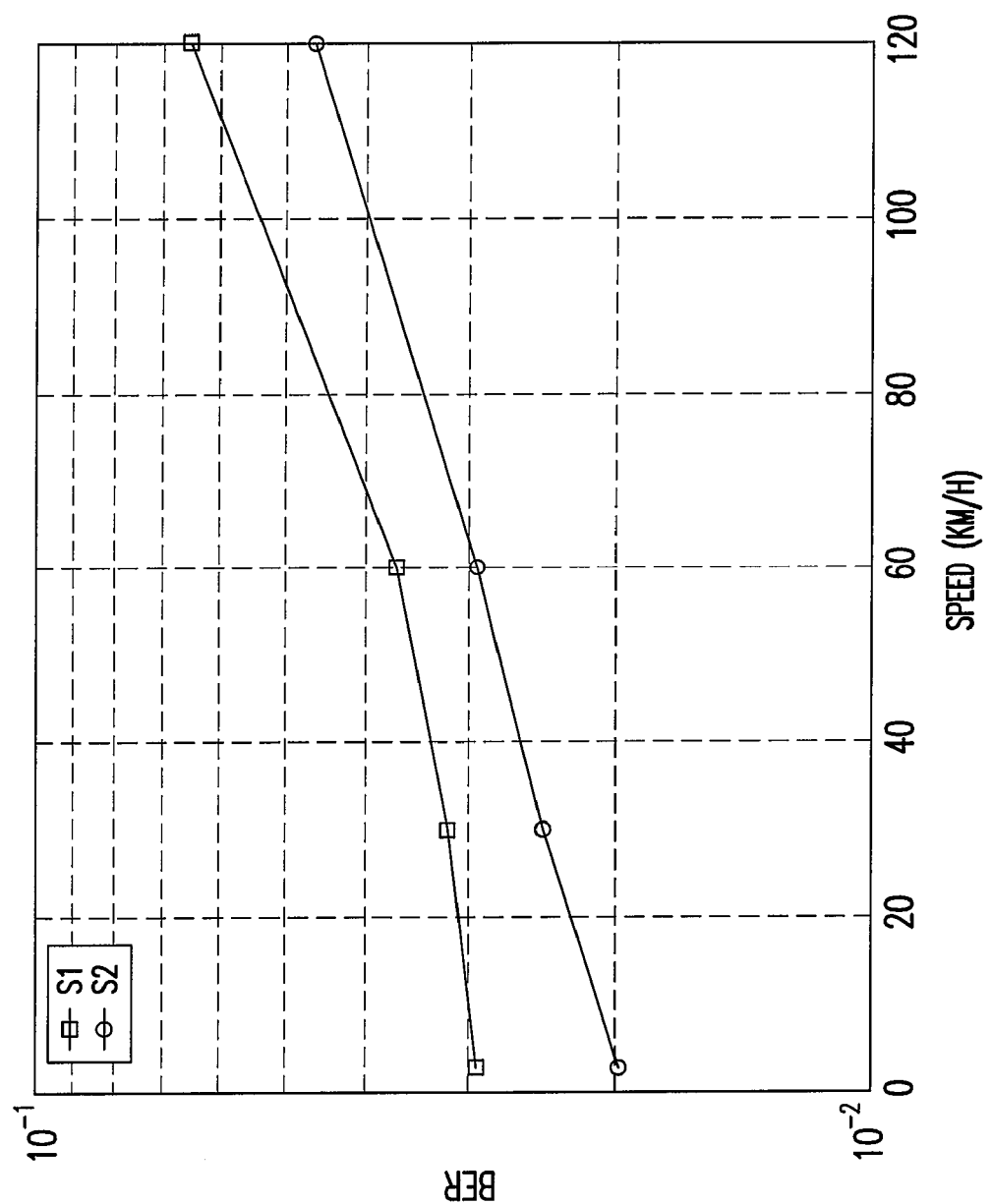
FIG. 16 is a trend chart of a bit error rate under different moving speed of the receiving end.

The performances of the receiving end are simulated below through software, and it is assumed that the above simulation employs a channel model shown by FIG. 8. FIG. 16 is a trend chart of a bit error rate under different moving speed of the receiving end. Referring to FIG. 16, the abscissa herein represents moving speed (km/h) and the ordinate represents BER. There are two simulation curves S1 and S2 in FIG. 16, wherein the curve S1 is the simulation curve corresponding to the prior art where the position containing the maximum power is for placing the CE window, and the curve S2 is the one corresponding to the above-mentioned embodiment. It can be seen from FIG. 16, the BER of the curve S1 is higher than the BER of the curve S2 no matter with a fast moving speed or a slow moving speed, which indicates a receiving end adopts the scheme of placing the CE window provided by the present invention has better performance than the prior art, no matter the channel is a fast fading channel or a slow fading channel.

In summary, the present invention has following advantages:

1. Since the present invention adjusts the timing of channel estimation according to the number of the delay paths and the channel power in the CE window, thus, the receiving end is able to place the CE window at a proper position even in the receiving end restricted by the hardware, which enables the channel estimation unit to obtain a more complete channel response to improve the performance of the receiving end.

2. In the algorithm for calculating the metric provided by the present invention, by using a scaling factor $\beta(L_i)$, the relationship between the number of the delay path and the metric is nonlinear, which makes the metric capable of more accurately predicting the influence of the CE window position on the performance of the receiving end.

3. By the adjustment mechanism, the present invention is able to avoid unnecessarily shifting the CE window position each time adjusting the timing of the channel estimation, or avoid frequently shifting the CE window position, which contributes to prevent the problem of unnecessary CE window position jump.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for timing control of channel estimation, comprising:
receiving a received signal from a transmitting end through a channel, wherein the channel has multiple delay paths;
searching a delay time of each of the delay paths of the channel and a channel power of each of the delay paths of the channel to obtain a channel power-delay profile;
providing a channel estimation window;
sequentially shifting a position of the channel estimation window in the channel power-delay profile in a specific time interval to obtain a plurality of candidate segments;
calculating a metric corresponding to each of the candidate segments according to a number of the delay paths and the channel power of the delay paths extracted from each of the candidate segments in the channel power-delay profile;
among all the metrics corresponding to every candidate segment, finding out an optimal segment with the maximum metric; and
deciding a timing based on the optimal segment, and then providing the decided timing to a channel estimation unit, so that the channel estimation unit performs channel estimation by the decided timing.

2. The method for timing control of channel estimation according to claim 1, wherein the channel estimation window comprises a left-side window and a right-side window, and the step of sequentially shifting the position of the channel estimation window in the channel power-delay profile in the specific time interval to obtain a plurality of candidate segments comprises:
sequentially rightwards shifting a position of the left-side window from the most left delay path up in the channel power-delay profile to obtain a plurality of left-side candidate segments;
sequentially leftwards shifting a position of the right-side window from the most right delay path up in the channel power-delay profile to obtain a plurality of right-side candidate segments; and
when the position of the left-side window and the position of the right-side window are overlapped each other or when a starting position of the left-side window locates at the right side of a starting position of the right-side window, stopping shifting the left-side window and the right-side window wherein a set of the left-side candidate segments and the right-side candidate segments is the above-mentioned candidate segments.

3. The method for timing control of channel estimation according to claim 1, wherein the step of sequentially shifting the position of the channel estimation window in the channel power-delay profile in a specific time interval to obtain a plurality of candidate segments comprises:
recording starting positions of the candidate segments in the channel power-delay profile, wherein the starting position of the $i^{th}$ candidate segment is represented by $X_i$; and recording the number of the delay paths contained in each of the candidate segments in the channel power-delay profile, wherein the number of the delay paths contained in the $i^{th}$ candidate segment is represented by $L_i$.

4. The method for timing control of channel estimation according to claim 3, further comprising:
recording the total power of the delay paths contained in the candidate segments in the channel power-delay profile, wherein the total power of the delay paths contained in the $i^{th}$ candidate segment is represented by $P_i$ which is the summation of the channel powers corresponding to the delay paths contained in the $i^{th}$ candidate segment.

5. The method for timing control of channel estimation according to claim 4, further comprising:
creating a table having a plurality of fields, wherein the $i^{th}$ field is corresponding to the $i^{th}$ candidate segment; and
storing the starting position $X_i$, the delay path number $L_i$ and the total power $P_i$ corresponding to the $i^{th}$ candidate segment into the $i^{th}$ field.

6. The method for timing control of channel estimation according to claim 5, wherein the step of calculating the metric corresponding to each of the candidate segments comprises:
calculating the metric corresponding to the $i^{th}$ candidate segment according to the number of the delay paths $L_i$ and the total power $P_i$ stored in the $i^{th}$ field of the table, wherein the metric corresponding to the $i^{th}$ candidate segment is represented by $M(X_i)$; and storing the metric $M(X_i)$ corresponding to the $i^{th}$ candidate segment into the $i^{th}$ field.

7. The method for timing control of channel estimation according to claim 6, wherein the starting position corresponding to the optimal segment is represented by $X_{max}$, and after the step of finding out the optimal segment, the method further comprises:
providing a prior segment, wherein the prior segment indicates the position of the preceding channel estimation window in the channel power-delay profile and the starting position of the prior segment is represented by $X_{prev}$;
using the starting positions of the candidate segments stored in the table to find out a continuous segment most near to the starting position of the prior segment $X_{prev}$ among the candidate segments, wherein the starting position of the continuous segment is represented by $X_{conti}$; and
using the metrics of the candidate segments stored in the table to determine whether the difference between the metric $M(X_{max})$ corresponding to the optimal segment and the metric $M(X_{conti})$ corresponding to the continuous segment is less than a threshold or not; if yes, deciding to take the continuous segment as a present segment; if no, deciding to take the optimal segment as the present segment, wherein the starting position of the present segment is represented by $X_{now}$.

8. The method for timing control of channel estimation according to claim 7, wherein after determining the present segment, the method further comprises:
determining whether the difference between the starting position $X_{now}$ of the present segment and the starting position $X_{prev}$ of the prior segment is less than a unit time or not; if yes, updating the starting position $X_{now}$ of the present segment with the starting position $X_{prev}$ of the prior segment; if no, keeping the starting position $X_{now}$ of the present segment unchanged.

9. The method for timing control of channel estimation according to claim 8, wherein the step of deciding the timing of channel estimation by using the optimal segment comprises:
shifting the channel estimation window to the position of the present segment.

10. The method for timing control of channel estimation according to claim 1, wherein among the candidate segments, the starting position of the $i^{th}$ candidate segment is represented by $X_i$, the number of the delay paths contained in the $i^{th}$ candidate segment is represented by $L_i$, the channel power of the delay paths contained in the $i^{th}$ candidate segment is represented by $P_i$ and the metric corresponding to the $i^{th}$ candidate segment is represented by $M(X_i)$, wherein $M(X_i)=P_i\cdot\beta(L_i)$ and $\beta(L_i)$ is scaling factor of $(L_i)$.

11. The method for timing control of channel estimation according to claim 10, wherein the mathematic expression of the scaling factor $\beta(L_i)$ is:

$$\beta(L_i) = \frac{L_i^L e^{-(L_i-1)}}{(L_i-1)!}.$$

12. An apparatus for timing control of channel estimation, comprising:
  a multipath searcher (MPS) for searching a delay time of each of the delay paths of a channel and a channel power of each of the delay paths of the channel to obtain a channel power-delay profile;
  a computing unit for sequentially shifting a position of a channel estimation window in the channel power-delay profile in a specific time interval to obtain a plurality of candidate segments and calculating a metric corresponding to each of the candidate segments according to a number of the delay paths and the channel power of the delay paths extracted from each of the candidate segments in the channel power-delay profile; and
  an adjustment unit for finding out an optimal segment with the maximum metric among the metrics respectively corresponding to the candidate segments and deciding a timing of channel estimation based on the optimal segment.

13. The apparatus for timing control of channel estimation according to claim 12, further comprising:
  a storage unit for storing a prior segment, wherein the prior segment indicates the position of the preceding channel estimation window in the channel power-delay profile.

14. The apparatus for timing control of channel estimation according to claim 13, wherein after the adjustment unit obtains the optimal segment, the adjustment unit further calculates the difference between the metric corresponding to the candidate segment most near to the prior segment among the candidate segments and the metric of the optimal segment and decides a present segment by using the calculated difference of the metrics.

15. The apparatus for timing control of channel estimation according to claim 13, wherein after the adjustment unit decides the present segment, the adjustment unit further calculates the difference between the starting position of the present segment in the channel power-delay profile and the starting position of the prior segment in the channel power-delay profile and adjusts the starting position of the present segment in the channel power-delay profile by using the calculated difference of the starting position, and after adjusting the starting position of the present segment, the channel estimation window is shifted to the position of the present segment.

* * * * *